US011436599B2

United States Patent
Wei et al.

(10) Patent No.: US 11,436,599 B2
(45) Date of Patent: Sep. 6, 2022

(54) BLOCKCHAIN-BASED IDENTITY VERIFICATION METHOD AND RELATED HARDWARE

(71) Applicant: Alipay (Hangzhou) Information Technology Co., Ltd., Zhejiang (CN)

(72) Inventors: Yawen Wei, Zhejiang (CN); Peng Qiu, Zhejiang (CN); Yin Dong, Zhejiang (CN); Yang Liu, Zhejiang (CN); Xiaobo Zhang, Zhejiang (CN); Pei Xu, Zhejiang (CN); Zhiwei Wang, Zhejiang (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 0 days.

(21) Appl. No.: 17/364,005

(22) Filed: Jun. 30, 2021

(65) Prior Publication Data

US 2022/0005029 A1 Jan. 6, 2022

(30) Foreign Application Priority Data

Jul. 3, 2020 (CN) .......................... 202010632502.1

(51) Int. Cl.
*G06Q 20/38* (2012.01)
*G06F 16/535* (2019.01)
(Continued)

(52) U.S. Cl.
CPC ....... *G06Q 20/3829* (2013.01); *G06F 16/535* (2019.01); *G06Q 20/40145* (2013.01);
(Continued)

(58) Field of Classification Search
CPC ................... G06Q 20/3829; G06Q 20/40145; H04L 9/30; H04L 9/088; G06F 16/535; G06K 9/00288
(Continued)

(56) References Cited

U.S. PATENT DOCUMENTS

| 10,719,593 B2* | 7/2020 | Kaga ....................... G06F 21/32 |
| 2002/0095569 A1* | 7/2002 | Jerdonek ............... H04L 9/3247 |
| | | 713/155 |

(Continued)

FOREIGN PATENT DOCUMENTS

| CN | 105227568 A | 1/2016 |
| CN | 106453278 A | 2/2017 |

(Continued)

OTHER PUBLICATIONS

NPL Search Terms (Year: 2021).*
(Continued)

*Primary Examiner* — Syed A Zaidi
(74) *Attorney, Agent, or Firm* — Seed IP Law Group LLP

(57) ABSTRACT

Implementations of the present specification provide a blockchain-based identity verification method and related hardware. The method includes: An agent client generates an identity verification request based on identity verification input information of a business platform, the identity verification input information indicating an identity verification parameter for identity verification and an identity verification platform that executes the identity verification. The agent client sends the identity verification request to the identity verification platform. The identity verification platform performs identity verification on the identity verification parameter to obtain a result of the identity verification. The identity verification platform submits a transaction including a verifiable credential of a result of the identity verification to a blockchain. The business platform searches a block of the blockchain for the transaction including the verifiable credential to determine a result of the identity verification corresponding to the identity verification request based on the verifiable credential.

20 Claims, 6 Drawing Sheets

(51) Int. Cl.
*G06V 40/16* (2022.01)
*G06Q 20/40* (2012.01)
*H04L 9/08* (2006.01)
*H04L 9/30* (2006.01)

(52) U.S. Cl.
CPC ............ *G06V 40/172* (2022.01); *H04L 9/088* (2013.01); *H04L 9/30* (2013.01)

(58) Field of Classification Search
USPC .......................................................... 705/71
See application file for complete search history.

(56) References Cited

U.S. PATENT DOCUMENTS

| | | | | |
|---|---|---|---|---|
| 2003/0076962 | A1* | 4/2003 | Roh | H04L 63/0823 380/282 |
| 2007/0283164 | A1* | 12/2007 | Nishizawa | H04L 9/3231 713/186 |
| 2008/0065895 | A1* | 3/2008 | Liu | H04L 63/0861 713/176 |
| 2009/0307764 | A1* | 12/2009 | Isobe | H04L 9/3231 726/7 |
| 2009/0320095 | A1* | 12/2009 | Nanda | G06F 21/33 726/2 |
| 2010/0011421 | A1* | 1/2010 | Chari | G06F 21/31 726/5 |
| 2011/0188508 | A1* | 8/2011 | Hjelm | H04L 63/0815 370/401 |
| 2013/0246281 | A1* | 9/2013 | Yamada | H04L 9/3263 705/71 |
| 2017/0366348 | A1* | 12/2017 | Weimer | H04L 9/3242 |
| 2020/0026834 | A1 | 1/2020 | Vimadalal et al. | |
| 2021/0160236 | A1* | 5/2021 | Ray | H04L 9/3213 |
| 2022/0021552 | A1* | 1/2022 | Ansari | H04L 12/66 |

FOREIGN PATENT DOCUMENTS

| | | |
|---|---|---|
| CN | 110046482 A | 7/2019 |
| CN | 110795501 A | 2/2020 |
| WO | WO 2019179533 A2 | 9/2019 |

OTHER PUBLICATIONS

NPL Search Terms (Year: 2022).*
Takemiya, Makoto, and Bohdan Vanieiev. "Sora identity: Secure, digital identity on the blockchain." 2018 IEEE 42nd annual computer software and applications conference (compsac). vol. 2. IEEE, 2018. (Year: 2018).*
El Haddouti, Samia, and M. Dafir Ech-Cherif El Kettani. "Analysis of identity management systems using blockchain technology." 2019 International Conference on Advanced Communication Technologies and Networking (CommNet). IEEE, 2019. (Year: 2019).*

* cited by examiner

BLOCKCHAIN-BASED IDENTITY VERIFICATION METHOD AND RELATED HARDWARE

BACKGROUND

Technical Field

The present disclosure relates to the field of data processing technologies, in particular, to a blockchain-based identity verification method and related hardware.

Description of the Related Art

Identity verification is one of the common methods for risk identification. It relies on assistance from personal characteristic information (such as face information, fingerprint information, etc.). At present, such information is privacy data, and it is inconvenient to output this information across platforms or across borders under supervision.

For some platform organizations without an identity verification capability, how to implement the identity verification by using data resources of other platform organizations, to eliminate risks while meeting regulatory requirements of privacy data, becomes an urgent technical problem to be solved.

BRIEF SUMMARY

The present specification provides a blockchain-based identity verification method and related hardware, so as to implement identity verification across platforms and even across borders while ensuring no cross-domain privacy data.

The implementations of the present specification are implemented as follows:

According to a first aspect, a blockchain-based identity verification method is provided, including: generating, by an agent client, an identity verification request based on identity verification input information of a business platform, the identity verification input information indicating an identity verification parameter for identity verification and an identity verification platform that executes the identity verification; sending, by the agent client, the identity verification request to the identity verification platform; performing, by the identity verification platform, identity verification on the identity verification parameter to obtain a result of the identity verification; submitting, by the identity verification platform, a transaction including a verifiable credential of a result of the identity verification to a blockchain; and searching, by the business platform, a block of the blockchain for the transaction including the verifiable credential to determine a result of the identity verification corresponding to the identity verification request based on the verifiable credential.

According to a second aspect, a blockchain-based identity verification method is provided, including: obtaining, by an agent client, identity verification input information of a business platform and generating a corresponding identity verification request, the identity verification input information indicating an identity verification parameter for identity verification and an identity verification platform that executes the identity verification; and sending, by the agent client, the identity verification request to the identity verification platform for the identity verification platform to perform identity verification on the identity verification parameter and submit a transaction including a verifiable credential of a result of the identity verification to a blockchain, where the business platform is enabled to search a block of the blockchain for the transaction including the verifiable credential to determine a result of the identity verification corresponding to the identity verification request based on the verifiable credential.

According to a third aspect, a blockchain-based identity verification method is provided, including: providing, by a business platform, identity verification input information to an agent client, the identity verification input information indicating an identity verification parameter for identity verification and an identity verification platform that executes the identity verification for the agent client to generate a corresponding identity verification request based on the identity verification input information and send the identity verification request to the identity verification platform, and for the identity verification platform to perform identity verification on the identity verification parameter and submit a transaction including a verifiable credential of a result of the identity verification to a blockchain; and searching, by the business platform, a block of the blockchain for the transaction including the verifiable credential to determine a result of the identity verification corresponding to the identity verification request based on the verifiable credential.

According to a fourth aspect, a blockchain-based identity verification method is provided, including: obtaining, by an identity verification platform, an identity verification request sent by an agent client, the identity verification request being generated by the agent client based on identity verification input information of a business platform, the identity verification input information indicating an identity verification parameter for identity verification and an identity verification platform that executes the identity verification; performing, by the identity verification platform, identity verification on the identity verification parameter to obtain a result of the identity verification; submitting, by the identity verification platform, a transaction including a verifiable credential of a result of the identity verification to a blockchain for the business platform to search a block of the blockchain for the transaction including the verifiable credential to determine a result of the identity verification corresponding to the identity verification request based on the verifiable credential.

According to a fifth aspect, an identity verification method for privacy protection is provided, including: generating, by an agent client, an identity verification request based on identity verification input information of a business platform, the identity verification input information indicating an identity verification parameter for identity verification and an identity verification platform that executes the identity verification; sending, by the agent client, the identity verification request to the identity verification platform; performing, by the identity verification platform, identity verification on the identity verification parameter based on local security data to obtain a result of the identity verification, the security data being privacy data of the identity verification platform; submitting, by the identity verification platform, a transaction including a verifiable credential of a result of the identity verification to a blockchain; and searching, by the business platform, a block of the blockchain for the transaction including the verifiable credential to determine a result of the identity verification corresponding to the identity verification request based on the verifiable credential.

According to a sixth aspect, an identity verification method for privacy protection is provided, including: obtaining, by an agent client, identity verification input information of a business platform and generating a corresponding identity verification request, the identity verification input information indicating an identity verification parameter for identity verification and an identity verification platform that executes the identity verification; and sending, by the agent client, the identity verification request to the identity verification platform for the identity verification platform to perform identity verification on the identity verification parameter based on local security data and submit a transaction including a verifiable credential of a result of the identity verification to a blockchain, where the business platform is enabled to search a block of the blockchain for the transaction including the verifiable credential to determine a result of the identity verification corresponding to the identity verification request based on the verifiable credential, the security data being privacy data of the identity verification platform.

According to a seventh aspect, an identity verification method for privacy protection is provided, including: providing, by a business platform, identity verification input information to an agent client, the identity verification input information indicating an identity verification parameter for identity verification and an identity verification platform that executes the identity verification for the agent client to generate a corresponding identity verification request based on the identity verification input information and send the identity verification request to the identity verification platform, and for the identity verification platform to perform identity verification on the identity verification parameter based on local security data and submit a transaction including a verifiable credential of a result of the identity verification to a blockchain, the security data being privacy data of the identity verification platform; and searching, by the business platform, a block of the blockchain for the transaction including the verifiable credential to determine a result of the identity verification corresponding to the identity verification request based on the verifiable credential.

According to an eighth aspect, an identity verification method for privacy protection is provided, including: obtaining, by an identity verification platform, an identity verification request sent by an agent client, the identity verification request being generated by the agent client based on identity verification input information of a business platform, the identity verification input information indicating an identity verification parameter for identity verification and an identity verification platform that executes the identity verification; performing, by the identity verification platform, identity verification on the identity verification parameter based on local security data to obtain a result of the identity verification, the security data being privacy data of the identity verification platform; and submitting, by the identity verification platform, a transaction including a verifiable credential of a result of the identity verification to a blockchain for the business platform to search a block of the blockchain for the transaction including the verifiable credential to determine a result of the identity verification corresponding to the identity verification request based on the verifiable credential.

According to a ninth aspect, an agent server is provided, including: an acquisition module, configured to obtain identity verification input information of a business platform and generate a corresponding identity verification request, the identity verification input information indicating an identity verification parameter for identity verification and an identity verification platform that executes the identity verification; and a sending module, configured to send the identity verification request to the identity verification platform for the identity verification platform to perform identity verification on the identity verification parameter and submit a transaction including a verifiable credential of a result of the identity verification to a blockchain, where the business platform is enabled to search a block of the blockchain for the transaction including the verifiable credential to determine a result of the identity verification corresponding to the identity verification request based on the verifiable credential.

According to a tenth aspect, an electronic device is provided, including a memory, a processor, and a computer program stored on the memory and executable on the processor, the computer program being executed by the processor to: obtain identity verification input information of a business platform and generate a corresponding identity verification request, the identity verification input information indicating an identity verification parameter for identity verification and an identity verification platform that executes the identity verification; and send the identity verification request to the identity verification platform for the identity verification platform to perform identity verification on the identity verification parameter and submit a transaction including a verifiable credential of a result of the identity verification to a blockchain, where the business platform is enabled to search a block of the blockchain for the transaction including the verifiable credential to determine a result of the identity verification corresponding to the identity verification request based on the verifiable credential.

According to an eleventh aspect, a computer-readable storage medium is provided, the computer-readable storage medium storing a computer program, and in response to being executed by a processor, the computer program implementing the following steps: obtaining identity verification input information of a business platform and generating a corresponding identity verification request, the identity verification input information indicating an identity verification parameter for identity verification and an identity verification platform that executes the identity verification; and sending the identity verification request to the identity verification platform for the identity verification platform to perform identity verification on the identity verification parameter and submit a transaction including a verifiable credential of a result of the identity verification to a blockchain, where the business platform is enabled to search a block of the blockchain for the transaction including the verifiable credential to determine a result of the identity verification corresponding to the identity verification request based on the verifiable credential.

According to a twelfth aspect, a business platform is provided, including: a provision module, configured to provide identity verification input information to an agent client, the identity verification input information indicating an identity verification parameter for identity verification and an identity verification platform that executes the identity verification for the agent client to generate a corresponding identity verification request based on the identity verification input information and send the identity verification request to the identity verification platform, and for the identity verification platform to perform identity verification on the identity verification parameter and submit a transaction including a verifiable credential of a result of the identity verification to a blockchain; and an implementation module, configured to search a block of the blockchain for the transaction including the verifiable credential to determine a result of the identity verification corresponding to the identity verification request based on the verifiable credential.

According to a thirteenth aspect, an electronic device is provided, including a memory, a processor, and a computer program stored on the memory and executable on the processor, the computer program being executed by the processor to: provide identity verification input information to an agent client, the identity verification input information indicating an identity verification parameter for identity verification and an identity verification platform that executes the identity verification for the agent client to generate a corresponding identity verification request based on the identity verification input information and send the identity verification request to the identity verification platform, and for the identity verification platform to perform identity verification on the identity verification parameter and submit a transaction including a verifiable credential of a result of the identity verification to a blockchain; and search a block of the blockchain for the transaction including the verifiable credential to determine a result of the identity verification corresponding to the identity verification request based on the verifiable credential.

According to a fourteenth aspect, a computer-readable storage medium is provided, the computer-readable storage medium storing a computer program, and in response to being executed by a processor, the computer program implementing the following steps: providing identity verification input information to an agent client, the identity verification input information indicating an identity verification parameter for identity verification and an identity verification platform that executes the identity verification for the agent client to generate a corresponding identity verification request based on the identity verification input information and send the identity verification request to the identity verification platform, and for the identity verification platform to perform identity verification on the identity verification parameter and submit a transaction including a verifiable credential of a result of the identity verification to a blockchain; and searching a block of the blockchain for the transaction including the verifiable credential to determine a result of the identity verification corresponding to the identity verification request based on the verifiable credential.

According to a fifteenth aspect, an identity verification platform is provided, including: an acquisition module, configured to obtain an identity verification request sent by an agent client, the identity verification request being generated by the agent client based on identity verification input information of a business platform, the identity verification input information indicating an identity verification parameter for identity verification and an identity verification platform that executes the identity verification; an identity verification module, configured to perform identity verification on the identity verification parameter to obtain a result of the identity verification; and an upload module, configured to submit a transaction including a verifiable credential of a result of the identity verification to a blockchain for the business platform to search a block of the blockchain for the transaction including the verifiable credential to determine a result of the identity verification corresponding to the identity verification request based on the verifiable credential.

According to a sixteenth aspect, an electronic device is provided, including a memory, a processor, and a computer program stored on the memory and executable on the processor, the computer program being executed by the processor to: obtain an identity verification request sent by an agent client, the identity verification request being generated by the agent client based on identity verification input information of a business platform, the identity verification input information indicating an identity verification parameter for identity verification and an identity verification platform that executes the identity verification; perform identity verification on the identity verification parameter to obtain a result of the identity verification; and submit a transaction including a verifiable credential of a result of the identity verification to a blockchain for the business platform to search a block of the blockchain for the transaction including the verifiable credential to determine a result of the identity verification corresponding to the identity verification request based on the verifiable credential.

According to a seventeenth aspect, a computer-readable storage medium is provided, the computer-readable storage medium storing a computer program, and in response to being executed by a processor, the computer program implementing the following steps: obtaining an identity verification request sent by an agent client, the identity verification request being generated by the agent client based on identity verification input information of a business platform, the identity verification input information indicating an identity verification parameter for identity verification and an identity verification platform that executes the identity verification; performing identity verification on the identity verification parameter to obtain a result of the identity verification; and submitting a transaction including a verifiable credential of a result of the identity verification to a blockchain for the business platform to search a block of the blockchain for the transaction including the verifiable credential to determine a result of the identity verification corresponding to the identity verification request based on the verifiable credential.

The solution in the implementations of the present application does not rely on a central site, and can implement identity verification across platforms and even across borders while ensuring no cross-domain privacy data. In addition, a blockchain is used to store the verifiable credential of the result of the identity verification as a proof, and therefore the result of the identity verification cannot be tampered with and can be retrieved quickly, thereby meeting a requirement for cross-platform and cross-border identity verification. For the identity verification platform, the whole solution more easily meets regulatory requirements of privacy data. Therefore, identity verification has a low explanation cost, is highly practicable, and has a high popularization value.

BRIEF DESCRIPTION OF THE SEVERAL VIEWS OF THE DRAWINGS

To describe technical solutions in implementations of the present specification or in the existing technologies more clearly, the following is a brief introduction of the accompanying drawings for illustrating the implementations or the existing technologies. Clearly, the accompanying drawings described below are merely some implementations of the present specification, and a person of ordinary skill in the art can still derive other drawings from such accompanying drawings without making innovative efforts.

DETAILED DESCRIPTION

To make a person skilled in the art better understand the technical solutions in the present specification, the following clearly and completely describes the technical solutions in the implementations of the present specification with reference to the accompanying drawings in the implementations of the present specification. Clearly, the described implementations are merely some rather than all of the implementations of the present specification. All other implementations obtained by a person of ordinary skill in the art based on the implementations of the present specification without making innovative efforts shall fall within the protection scope of the present specification.

As described above, identity verification relies on assistance from personal characteristic information (such as face information, fingerprint information, etc.). At present, such information is privacy data, and it is inconvenient to output this information across platforms or across borders under supervision. For some platform organizations without an identity verification capability, how to implement the identity verification by using data resources of other platform organizations, to eliminate risks while meeting regulatory requirements of privacy data, becomes an urgent technical problem to be solved by the present specification.

Figure 1:
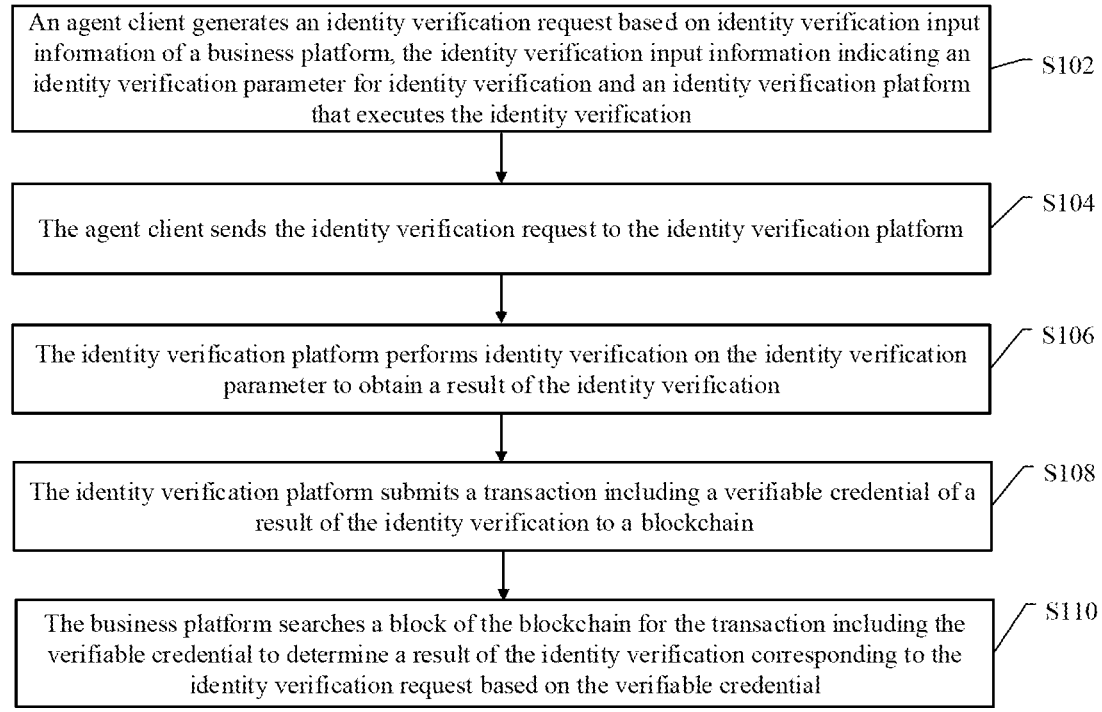
FIG. 1 is a first schematic flowchart illustrating a blockchain-based identity verification method according to an implementation of the present specification.

FIG. 1 is a flowchart illustrating a blockchain-based identity verification method according to an implementation of the present specification. The method shown in FIG. 1 can be performed by an apparatus as also described herein, and includes the following steps:

S102: An agent client generates an identity verification request based on identity verification input information of a business platform, the identity verification input information indicating an identity verification parameter for identity verification and an identity verification platform that executes the identity verification.

In the implementation of the present specification, the agent client can be an intermediate platform between the business platform and the identity verification platform. For example, if the identity verification platform is a cross-border platform relative to the business platform, the agent client can be an application client of a gateway type to implement the service of sending the identity verification request of the business platform to the identity verification platform across borders.

For example, the identity verification request can include signature data encrypted based on a private key of the business platform to ensure source authenticity. That is, the identity verification platform can decrypt the signature data in the identity verification request by using a public key provided by the business platform, so as to determine that the identity verification request comes from the business platform.

S104: The agent client sends the identity verification request to the identity verification platform.

For example, in the present step, the agent client can provide a near-end service specific to the business platform and the identity verification platform. The agent client obtains the identity verification input information of the business platform through a gateway on the business platform side, so as to generate the identity verification request corresponding to the business platform. Afterwards, the agent client forwards the identity verification request to the identity verification platform through a gateway on the identity verification platform side.

S106: The identity verification platform performs identity verification on the identity verification parameter to obtain a result of the identity verification.

In the implementation of the present specification, the identity verification platform can provide its own public key to the business platform in advance, and the business platform can encrypt the identity verification parameter by using the public key of the identity verification platform and provide the identity verification parameter to the agent client as the identity verification input information, so as to generate the identity verification request.

In the present step, after receiving the identity verification request, the identity verification platform first verifies the signature data in the identity verification request based on the public key of the business platform. If the signature data is successfully verified, the identity verification platform further decrypts the identity verification parameter in the identity verification request based on its own private key, and performs the identity verification on the decrypted identity verification parameter.

In practice, the identity verification platform can provide identity verification services of different business categories, and the agent client can specify one of the identity verification business categories to the identity verification platform through the identity verification request for the identity verification platform to provide the corresponding identity verification service.

In addition, after receiving the identity verification request and before performing the identity verification, the identity verification platform can determine whether the identity verification request meets an identity verification precondition. For example, the agent client can provide some identity verification auxiliary information to the identity verification platform through the identity verification request. After receiving the identity verification request, the identity verification platform first determines, based on the identity verification auxiliary information in the identity verification request, whether the identity verification request meets an identity verification precondition corresponding to an identity verification business category of the identity verification request. If the identity verification precondition is met, the identity verification platform performs the identity verification on the identity verification parameter.

The following description is provided as an example:

It is assumed that the identity verification business category is enterprise legal person face-based identity verification, that is, the business platform requests the identity verification platform to perform enterprise legal person identity recognition based on facial image information of an identity verification object. In this case, the corresponding identity verification input information may include the facial image information of the identity verification object. Correspondingly, the identity verification auxiliary information can include enterprise certificate information provided by the identity verification object to the business platform. Before performing the enterprise legal person face-based identity verification, the identity verification platform can first verify the authenticity of the enterprise certificate information, for example, verify whether at least one of the following identity verification preconditions is met: an enterprise legal person indicated by the enterprise certificate information of the identity verification object is consistent with the identity verification object, in other words, the identity verification object provides real enterprise certificate information to the business platform; a database used by the identity verification platform to perform identity verification on the facial image information of the identity verification object records a face sample of the enterprise legal person, in other words, the identity verification platform is capable of performing face recognition-based verification on the enterprise legal person; and the enterprise legal person is not blacklisted by the identity verification platform. For example, a blacklist may include that the enterprise legal person is frozen by the identity verification platform due to some business-level factors (such as having black records or frequently undergoing identity verification in a unit time).

S108: The identity verification platform submits a transaction including a verifiable credential of a result of the identity verification to a blockchain.

In the implementation of the specification, the verifiable credential includes a decentralized identifier (DID) signature of the identity verification platform to prove the source authenticity of the result of the identity verification.

After the identity verification platform submits the transaction including the verifiable credential of the result of the identity verification to the blockchain, a consensus node of the blockchain can initiate a consensus proposal for the transaction, and if the consensus proposal is successfully completed, each blockchain node generates a block recording the verifiable credential. Once the verifiable credential is successfully stored in the blockchain, the verifiable credential can be tampered with only by modifying the copies of the blockchain of more than half of the blockchain nodes, which is theoretically impossible to achieve. Therefore, an effective and reliable ledger function can be implemented.

S110: The business platform searches a block of the blockchain for the transaction including the verifiable credential to determine a result of the identity verification corresponding to the identity verification request based on the verifiable credential.

In the implementation of the present specification, the identity verification platform can generate a certificate ID for the identity verification request and submit the transaction including the verifiable credential of the result of the identity verification and the certificate ID to the blockchain. In addition, the identity verification platform can provide the certificate ID to the agent client for the agent client to notify the business platform of using the certificate ID to query and match the transaction including the verifiable credential from the blockchain.

The identity verification method in the implementations of the present application does not rely on a central site, and can implement identity verification across platforms and even across borders while ensuring no cross-domain privacy data. In addition, a blockchain is used to store the verifiable credential of the result of the identity verification as a proof, and therefore the result of the identity verification cannot be tampered with and can be retrieved quickly, thereby meeting a requirement for cross-platform and cross-border identity verification. For the identity verification platform, the whole solution more easily meets regulatory requirements of privacy data. Therefore, identity verification has a low explanation cost, is highly practicable, and has a high popularization value.

Figure 2:
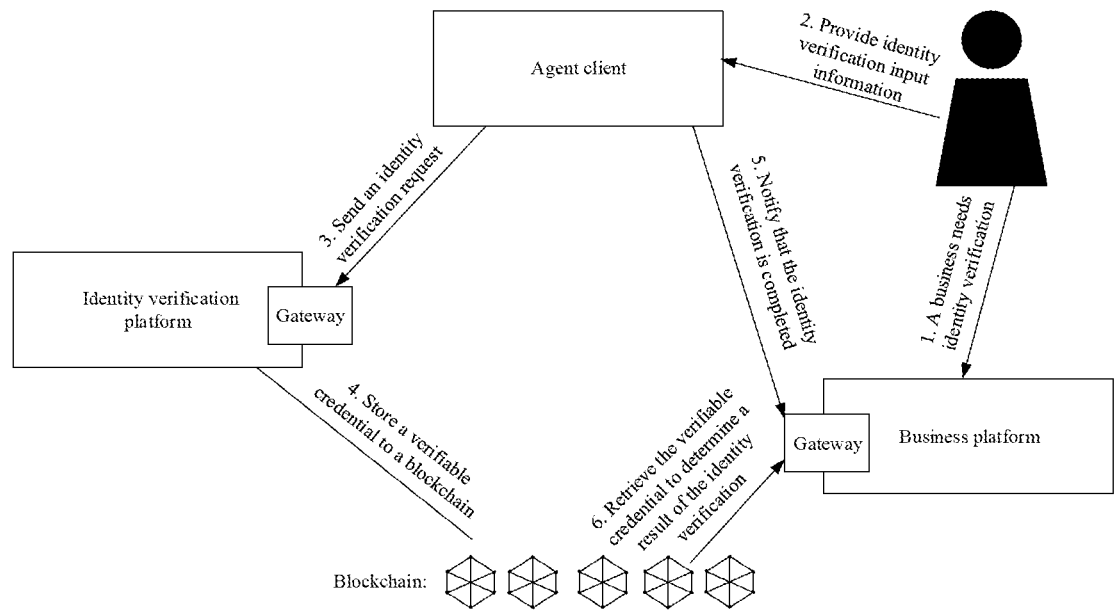
FIG. 2 is a schematic second flowchart illustrating a blockchain-based identity verification method according to an implementation of the present specification.

FIG. 2 is a schematic application diagram of an identity verification method according to an implementation of the present specification. When a business platform needs to perform identity verification based on a business operation of a user, the user can use an agent client to record identity verification input information for the agent client to generate an identity verification request and send it to an identity verification platform. After completing the identity verification based on the identity verification request, the identity verification platform uploads a verifiable credential of a result of the identity verification to a blockchain. Then, the agent client notifies the business platform that the identity verification is completed, and the business platform retrieves the verifiable credential from the blockchain to determine a result of the identity verification, so as to subsequently provide a corresponding service to the user based on the result of the identity verification.

The following describes the method in the implementation of the present specification in detail with reference to an example application scenario.

In the example application scenario, the business platform and the identity verification platform belong to the same online shopping platform. The business platform is deployed in country A and the identity verification platform is deployed in country B. For ease of understanding, the business platform is hereinafter referred to as a first shopping platform, and the identity verification platform is hereinafter referred to as a second shopping platform.

Herein, it is assumed that a target merchant from country B operates online shops on both the first shopping platform and the second shopping platform. A user on the first shopping platform needs to initiate identity verification on the target merchant before transferring money to the target merchant.

Since the target merchant comes from country B, the first shopping platform has no security data used for performing identity verification on the target merchant. In the example application scenario, the identity verification needs to be performed on the target merchant through the second shopping platform. A corresponding process includes the following steps:

Step 1: The first shopping platform initiates an identity verification initialization process to an agent client and provides corresponding identity verification input information. The identity verification input information can include a business identifier, a target site of the second shopping platform, a nationality of the target merchant, a shop certificate type of the target merchant, a merchant certificate of the target merchant, an identity verification business type, an identity verification parameter, and the like.

The nationality of the target merchant can be used as a routing parameter. For example, after it is known that the target merchant comes from country B, it can be known that the main site is deployed in country B. The identity verification parameter includes parameters for identity verification. For example, if the example application scenario is face-based identity verification, the identity verification parameter can include facial information of the target merchant; or if the present application scenario is reverse remittance, the identity verification parameter can include bank account information of the target merchant.

Step 2: The agent client generates an identity verification request based on the identity verification input information in step 1. The identity verification request can include a request ID, identity verification parameter ciphertext, a request parameter signature, etc.

The request ID is randomly generated by the agent client and can be used for tracing. The identity verification parameter ciphertext is obtained by encrypting the identity verification parameter by using a public key of the second shopping platform, and is used to ensure that only the second shopping platform can decrypt the content. The request parameter signature is a private key signature of the first shopping platform, and is used to prove that the identity verification request definitely comes from the first shopping platform. It can restrain the agent client from tampering with the identity verification request.

Step 3: The agent client sends the identity verification request to the second shopping platform through, e.g., the RPC over HTTP protocol.

Step 4: The identity verification request reaches the second shopping platform, and the second shopping platform uses a public key of the first shopping platform to check the request parameter signature to determine whether the source is correct, and uses a local private key to complete decryption of the identity verification parameter ciphertext.

Step 5: The second shopping platform determines whether an identity verification precondition is met. An example judgment logic includes: a. whether information about the target merchant is consistent with legal person information for the online shop operated by the target merchant on the second shopping platform; b. whether a legal person of the online shop operated by the target merchant on the second shopping platform leaves a facial image in a public security system; and c. whether the target merchant is frozen. Example scenarios of a merchant being frozen include that the merchant has black records so the business of the merchant is frozen.

Step 6: If the identity verification precondition is met, the second shopping platform performs face-based identity verification on the target merchant, and submits a verifiable credential (VC) of a result of the identity verification to a blockchain in a form of transaction.

The content of the VC can include a decentralization identifier (DID) of the target merchant, a DID of the second shopping platform, a result of the identity verification, and a DID signature of the second shopping platform.

Based on an existing verifiable credential method, the second shopping platform generates a VCID and uses it as a certificate ID of the present identity verification request. The certificate ID is used to retrieve the transaction including the VC from the blockchain.

Step 7: The second shopping platform feeds the certificate ID back to the first shopping platform through the agent client.

Step 8: The first shopping platform searches a block for the transaction including the VC by using the certificate ID, verifies the DID signature of the second shopping platform included in the VC, and determines whether the VC is issued by the second shopping platform.

If it is determined that the VC is issued by the second shopping platform, a result of the identity verification in the VC is determined as a final identity verification result of the present identity verification request.

Certainly, in the example application scenario, the second shopping platform can directly provide the result of the identity verification to the first shopping platform through the agent client. Correspondingly, in the present step, after obtaining the VC from the blockchain, the first shopping platform performs, based on the result of the identity verification in the VC, a secondary check on the result of the identity verification fed back by the agent client.

It should be understood that the above application scenario is a description on the method in the implementation of the present specification. Appropriate changes can further be made without departing from the above principle basis described herein, and these changes shall also be regarded as falling in the protection scope of the implementations of the present specification. For example, in the identity verification method in the implementation of the present specification, the business platform and the identity verification platform can belong to the same organization or different organizations in the borer. In addition, the identity verification platform can also provide the identity verification for other business categories. Details are not described herein again.

Figure 3:
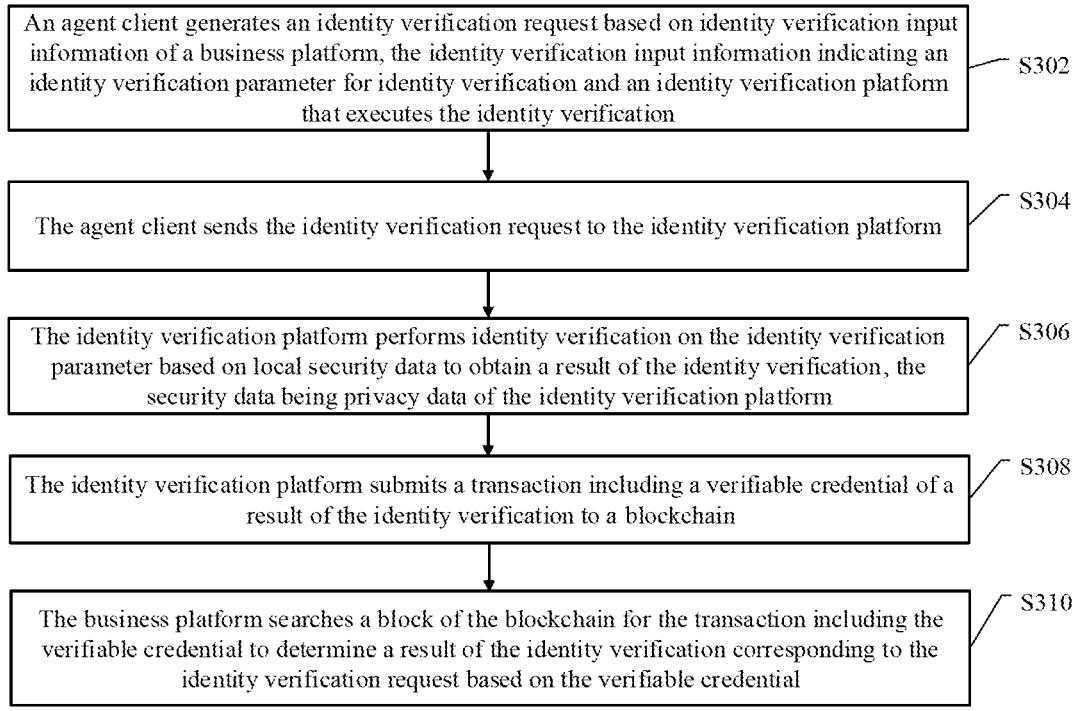
FIG. 3 is a schematic flowchart illustrating an identity verification method for privacy protection according to an implementation of the present specification.

Further, an implementation of the present specification further provides an identity verification method for privacy protection. FIG. 3 is a flowchart illustrating an identity verification method for privacy protection according to an implementation of the present specification. The method includes:

S302: An agent client generates an identity verification request based on identity verification input information of a business platform, the identity verification input information indicating an identity verification parameter for identity verification and an identity verification platform that executes the identity verification.

S304: The agent client sends the identity verification request to the identity verification platform.

S306: The identity verification platform performs identity verification on the identity verification parameter based on local security data to obtain a result of the identity verification, the security data being privacy data of the identity verification platform.

S308: The identity verification platform submits a transaction including a verifiable credential of a result of the identity verification to a blockchain.

S310: The business platform searches a block of the blockchain for the transaction including the verifiable credential to determine a result of the identity verification corresponding to the identity verification request based on the verifiable credential.

It can be learned from the identity verification method shown in FIG. 3 that the identity verification platform in the implementation of the present specification can perform identity verification on the identity verification parameter provided by the business platform through local security data to obtain a result of the identity verification. Afterwards, the identity verification platform uploads only the verifiable credential of the result of the identity verification of to the blockchain for query by the business platform. During the whole process, highly sensitive security data is not sent out from the identity verification platform. Therefore, disclosure risks are avoided, thereby achieving the effect of privacy protection.

Figure 4:
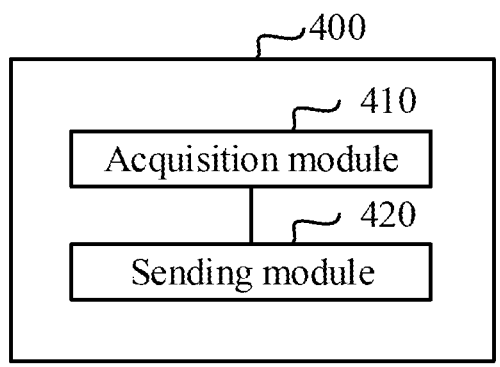
FIG. 4 is a schematic structural diagram illustrating an agent server according to an implementation of the present specification.

Corresponding to the identity verification method shown in FIG. 1, an implementation of the present specification further provides an agent server. FIG. 4 is a schematic structural diagram illustrating an agent server 400 according to an implementation of the present specification. The agent server 400 includes: an acquisition module 410, configured to obtain identity verification input information of a business platform and generate a corresponding identity verification request, the identity verification input information indicating an identity verification parameter for identity verification and an identity verification platform that executes the identity verification; and a sending module 420, configured to send the identity verification request to the identity verification platform for the identity verification platform to perform identity verification on the identity verification parameter and submit a transaction including a verifiable credential of a result of the identity verification to a blockchain, where the business platform is enabled to search a block of the blockchain for the transaction including the verifiable credential to determine a result of the identity verification corresponding to the identity verification request based on the verifiable credential.

Clearly, the agent server in the implementation of the present specification can implement the steps performed by the agent client in the identity verification method shown in FIG. 1 above. As the principles are the same, details are omitted herein for simplicity.

Figure 5:
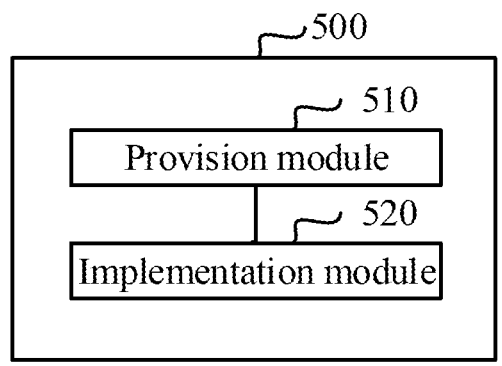
FIG. 5 is a schematic structural diagram illustrating a business platform according to an implementation of the present specification.

Corresponding to the identity verification method shown in FIG. 1, an implementation of the present specification further provides a business platform. FIG. 5 is a structural diagram of a business platform 500 according to an implementation of the present specification. The business platform 500 includes: a provision module 510, configured to provide identity verification input information to an agent client, the identity verification input information indicating an identity verification parameter for identity verification and an identity verification platform that executes the identity verification for the agent client to generate a corresponding identity verification request based on the identity verification input information and send the identity verification request to the identity verification platform, and for the identity verification platform to perform identity verification on the identity verification parameter and submit a transaction including a verifiable credential of a result of the identity verification to a blockchain; and an implementation module 520, configured to search a block of the blockchain for the transaction including the verifiable credential to determine a result of the identity verification corresponding to the identity verification request based on the verifiable credential.

In some implementations, after determining that the identity verification request meets an identity verification precondition corresponding to an identity verification business category of the identity verification request, the identity verification platform generates a certificate ID of the identity verification request, and submits the transaction including a verifiable credential of a result of the identity verification and the certificate ID to the blockchain. Correspondingly, the implementation module 520 identifies the transaction including the verifiable credential from the blockchain based on the certificate ID. Afterwards, the implementation module 520 verifies a decentralization identifier (DID) signature of the identity verification platform included in the verifiable credential; and if the verifying the DID signature of the identity verification platform is successful, further determines a result of the identity verification indicated by the verifiable credential as a final identity verification result of the identity verification request.

Clearly, the business platform in the implementation of the present specification can implement the steps performed by the business platform in the identity verification method shown in FIG. 1 above. As the principles are the same, details are omitted herein for simplicity.

Figure 6:
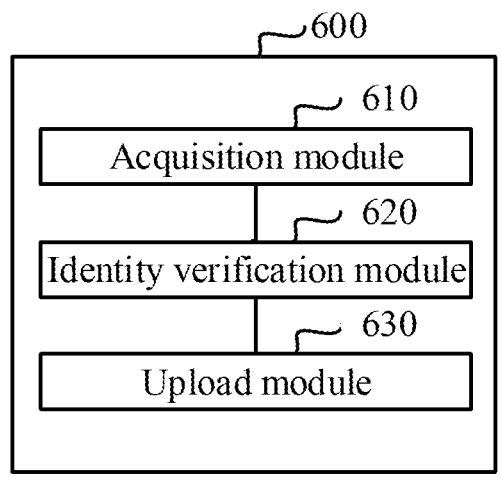
FIG. 6 is a schematic structural diagram illustrating an identity verification platform according to an implementation of the present specification.

Corresponding to the identity verification method shown in FIG. 1, an implementation of the present specification further provides an identity verification platform. FIG. 6 is a structural diagram of an identity verification platform 600 according to an implementation of the present specification. The identity verification platform 600 includes: an acquisition module 610, configured to obtain an identity verification request sent by an agent client, the identity verification request being generated by the agent client based on identity verification input information of a business platform, the identity verification input information indicating an identity verification parameter for identity verification and an identity verification platform that executes the identity verification; an identity verification module 620, configured to perform identity verification on the identity verification parameter to obtain a result of the identity verification; and an upload module 630, configured to submit a transaction including a verifiable credential of a result of the identity verification to a blockchain for the business platform to search a block of the blockchain for the transaction including the verifiable credential to determine a result of the identity verification corresponding to the identity verification request based on the verifiable credential.

In some implementations, the identity verification request includes signature data encrypted based on a private key of the business platform and an identity verification parameter encrypted based on a public key of the identity verification platform. The identity verification module 620 verifies the signature data in the identity verification request based on a public key of the business platform after receiving the identity verification request; and in response to that the signature data is successfully verified, the identity verification module 620 decrypts the identity verification parameter in the identity verification request based on a private key of the identity verification platform; and performs the identity verification on the decrypted identity verification parameter.

In some implementations, the identity verification request indicates an identity verification business category of the identity verification request and identity verification auxiliary information. The identity verification module 620 determines, based on the identity verification auxiliary information in the identity verification request, whether the identity verification request meets an identity verification precondition corresponding to the identity verification business category; and if the identity verification precondition is met, the identity verification module 620 further performs the identity verification on the identity verification parameter.

In some implementations, the identity verification business category is enterprise legal person face-based identity verification, the identity verification input information includes facial image information of an identity verification object, and the identity verification auxiliary information includes enterprise certificate information of the identity verification object; where an identity verification precondition corresponding to the enterprise legal person face-based identity verification includes at least one of the following: an enterprise legal person indicated by the enterprise certificate information of the identity verification object is consistent with the identity verification object; and a database used by the identity verification platform to perform identity verification on the facial image information of the identity verification object records a face sample of the enterprise legal person.

In some implementations, the upload module 630 generates a certificate ID of the identity verification request after determining that the identity verification request meets the identity verification precondition corresponding to the identity verification business category; and afterwards submits the transaction including the verifiable credential of the result of the identity verification and the certificate ID to the blockchain for the business platform to identify the transaction including the verifiable credential from the blockchain based on the certificate ID.

Clearly, the identity verification platform in the implementation of the present specification can implement the steps performed by the identity verification platform in the identity verification method shown in FIG. 1 above. As the principles are the same, details are omitted herein for simplicity.

Figure 7:
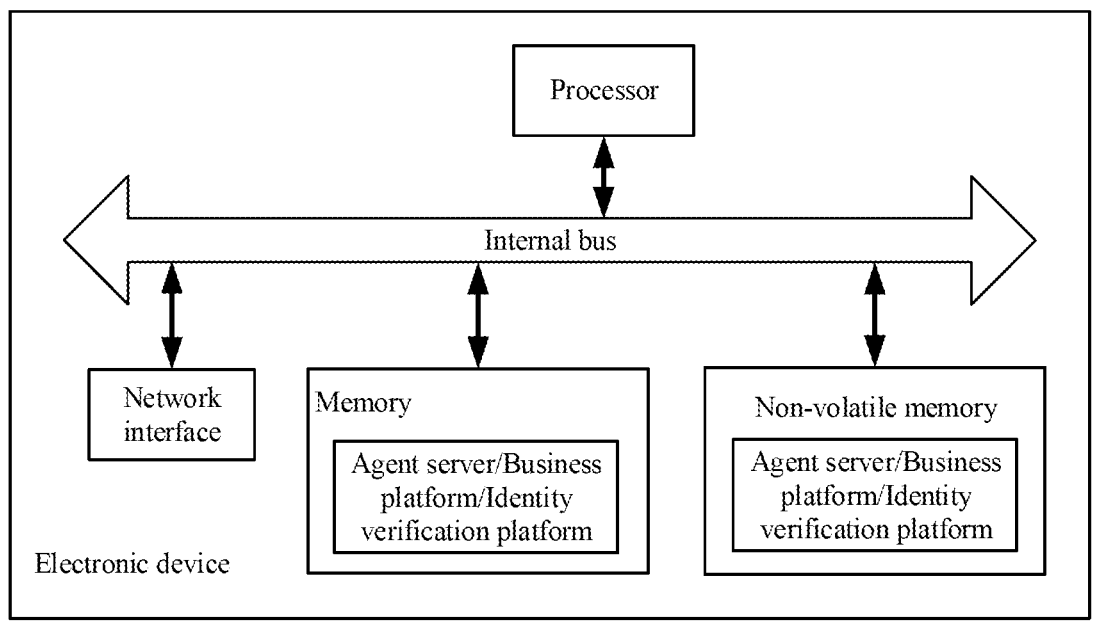
FIG. 7 is a schematic structural diagram illustrating an electronic device according to an implementation of the present specification.

FIG. 7 is a schematic structural diagram illustrating an electronic device according to an implementation of the present specification. Referring to FIG. 7, in terms of hardware, the electronic device includes a processor, and in some implementations further includes an internal bus, a network interface, and a storage. The storage may include a memory, for example, a high-speed random access memory (RAM), and may further include a non-volatile memory, for example, at least one magnetic disk storage. Certainly, the electronic device may further include hardware needed by another business.

The processor, the network interface, and the storage can be connected to each other by using the internal bus. The internal bus can be an industry standard architecture (ISA) bus, a Peripheral Component Interconnect (PCI) bus, an extended industry standard architecture (EISA) bus, etc. The bus can be classified into an address bus, a data bus, a control bus, etc. For ease of indication, the bus is indicated by using only one double-headed arrow in FIG. 7. However, it does not mean that there is only one bus or only one type of bus.

The storage is configured to store a program. The program can include program code, and the program code includes a computer operation instruction. The storage can include a memory and a non-volatile memory, and provide an instruction and data for the processor.

The processor reads a corresponding computer program from the non-volatile memory into the memory for running, so as to logically form the agent server shown in FIG. 4 above (which may also be considered an agent client). The processor executes the program stored in the storage, and is, for example, specifically configured to perform the following operations: obtaining identity verification input information of a business platform and generating a corresponding identity verification request, the identity verification input information indicating an identity verification parameter for identity verification and an identity verification platform that executes the identity verification; and sending the identity verification request to the identity verification platform for the identity verification platform to perform identity verification on the identity verification parameter and submit a transaction including a verifiable credential of a result of the identity verification to a blockchain, where the business platform is enabled to search a block of the blockchain for the transaction including the verifiable credential to determine a result of the identity verification corresponding to the identity verification request based on the verifiable credential.

In some implementations, the processor reads a corresponding computer program from the non-volatile memory into the memory for running, so as to logically form the business platform shown in FIG. 5 above. The processor executes the program stored in the storage, and is, for example, configured to perform the following operations: providing identity verification input information to an agent client, the identity verification input information indicating an identity verification parameter for identity verification and an identity verification platform that executes the identity verification for the agent client to generate a corresponding identity verification request based on the identity verification input information and send the identity verification request to the identity verification platform, and for the identity verification platform to perform identity verification on the identity verification parameter and submit a transaction including a verifiable credential of a result of the identity verification to a blockchain; and searching a block of the blockchain for the transaction including the verifiable credential to determine a result of the identity verification corresponding to the identity verification request based on the verifiable credential.

In some implementations, the processor reads a corresponding computer program from the non-volatile memory into the memory for running, so as to logically form the identity verification platform shown in FIG. 6 above. The processor executes the program stored in the storage, and is, for example, configured to perform the following operations: obtaining an identity verification request sent by an agent client, the identity verification request being generated by the agent client based on identity verification input information of a business platform, the identity verification input information indicating an identity verification parameter for identity verification and an identity verification platform that executes the identity verification; performing identity verification on the identity verification parameter to obtain a result of the identity verification; and submitting a transaction including a verifiable credential of a result of the identity verification to a blockchain for the business platform to search a block of the blockchain for the transaction including the verifiable credential to determine a result of the identity verification corresponding to the identity verification request based on the verifiable credential.

Further, the processor in the implementation of the present specification reads a corresponding computer program from the non-volatile memory into the memory for running, so as to logically form the agent server shown in FIG. 4 above. The processor executes the program stored in the storage, and is, for example, configured to perform the following operations: obtaining identity verification input information of a business platform and generating a corresponding identity verification request, the identity verification input information indicating an identity verification parameter for identity verification and an identity verification platform that executes the identity verification; and sending the identity verification request to the identity verification platform for the identity verification platform to perform identity verification on the identity verification parameter based on local security data and submit a transaction including a verifiable credential of a result of the identity verification to a blockchain, where the business platform is enabled to search a block of the blockchain for the transaction including the verifiable credential to determine a result of the identity verification corresponding to the identity verification request based on the verifiable credential, the security data being privacy data of the identity verification platform.

In some implementations, the processor reads a corresponding computer program from the non-volatile memory into the memory for running, so as to logically form the business platform shown in FIG. 5 above. The processor executes the program stored in the storage, and is, for example, configured to perform the following operations:

providing identity verification input information to an agent client, the identity verification input information indicating an identity verification parameter for identity verification and an identity verification platform that executes the identity verification for the agent client to generate a corresponding identity verification request based on the identity verification input information and send the identity verification request to the identity verification platform, and for the identity verification platform to perform identity verification on the identity verification parameter based on local security data and submit a transaction including a verifiable credential of a result of the identity verification to a blockchain, the security data being privacy data of the identity verification platform; and searching a block of the blockchain for the transaction including the verifiable credential to determine a result of the identity verification corresponding to the identity verification request based on the verifiable credential.

In some implementations, the processor reads a corresponding computer program from the non-volatile memory into the memory for running, so as to logically form the identity verification platform shown in FIG. 6 above. The processor executes the program stored in the storage, and is, for example, configured to perform the following operations: obtaining an identity verification request sent by an agent client, the identity verification request being generated by the agent client based on identity verification input information of a business platform, the identity verification input information indicating an identity verification parameter for identity verification and an identity verification platform that executes the identity verification; performing identity verification on the identity verification parameter based on local security data to obtain a result of the identity verification, the security data being privacy data of the identity verification platform; and submitting a transaction including a verifiable credential of a result of the identity verification to a blockchain for the business platform to search a block of the blockchain for the transaction including the verifiable credential to determine a result of the identity verification corresponding to the identity verification request based on the verifiable credential.

The identity verification method disclosed in the implementation shown in FIG. 1 or FIG. 3 of the present specification may be applied to or implemented by a processor. The processor may be an integrated circuit chip and have a signal processing capability. In an implementation process, steps in the foregoing methods can be implemented by using a hardware integrated logical circuit in the processor, or by using instructions in a form of software. The processor can be a general-purpose processor, including a central processing unit (CPU), a network processor (NP), etc.; or can be a digital signal processor (DSP), an application-specific integrated circuit (ASIC), a field programmable gate array (FPGA) or another programmable logical device, a discrete gate or transistor logic device, a discrete hardware component, etc. The processor can implement or execute the methods, steps, and logical block diagrams disclosed in the implementations of the present specification. The general-purpose processor may be a microprocessor, or the processor may be any conventional processor or the like. The steps of the method disclosed with reference to the implementations of the present specification can be directly performed and completed by using a hardware decoding processor, or by using a combination of hardware and software modules in a decoding processor. A software module can be located in a mature storage medium in the art, such as a random access memory, a flash memory, a read-only memory, a programmable read-only memory, an electrically erasable programmable memory, a register, or the like. The storage medium is located in the memory, and the processor reads information in the memory and completes the steps in the above methods in combination with hardware of the processor.

Certainly, in addition to a software implementation, the electronic device of the present specification does not exclude another implementation, for example, a logic device or a combination of hardware and software. That is, an execution body of the following processing procedure is not limited to each logical unit, and can also be hardware or a logic device.

In addition, an implementation of the present specification further provides a computer-readable storage medium. The computer-readable storage medium stores one or more programs, and the one or more programs include instructions.

When executed by a portable electronic device including a plurality of application programs, the instructions enable the portable electronic device to perform the steps of the identity verification method shown in FIG. 1 related to the agent client, including: obtaining identity verification input information of a business platform and generating a corresponding identity verification request, the identity verification input information indicating an identity verification parameter for identity verification and an identity verification platform that executes the identity verification; and sending the identity verification request to the identity verification platform for the identity verification platform to perform identity verification on the identity verification parameter and submit a transaction including a verifiable credential of a result of the identity verification to a blockchain, where the business platform is enabled to search a block of the blockchain for the transaction including the verifiable credential to determine a result of the identity verification corresponding to the identity verification request based on the verifiable credential.

In some implementations, when executed by a portable electronic device including a plurality of application programs, the instructions enable the portable electronic device to perform the steps of the identity verification method shown in FIG. 1 related to the business platform, including: providing identity verification input information to an agent client, the identity verification input information indicating an identity verification parameter for identity verification and an identity verification platform that executes the identity verification for the agent client to generate a corresponding identity verification request based on the identity verification input information and send the identity verification request to the identity verification platform, and for the identity verification platform to perform identity verification on the identity verification parameter and submit a transaction including a verifiable credential of a result of the identity verification to a blockchain; and searching a block of the blockchain for the transaction including the verifiable credential to determine a result of the identity verification corresponding to the identity verification request based on the verifiable credential.

In some implementations, when executed by a portable electronic device including a plurality of application programs, the instructions enable the portable electronic device to perform the steps of the identity verification method shown in FIG. 1 related to the identity verification platform, including: obtaining an identity verification request sent by an agent client, the identity verification request being generated by the agent client based on identity verification input information of a business platform, the identity verification input information indicating an identity verification parameter for identity verification and an identity verification platform that executes the identity verification; performing identity verification on the identity verification parameter to obtain a result of the identity verification; and submitting a transaction including a verifiable credential of a result of the identity verification to a blockchain for the business platform to search a block of the blockchain for the transaction including the verifiable credential to determine a result of the identity verification corresponding to the identity verification request based on the verifiable credential.

Further, when executed by a portable electronic device including a plurality of application programs, the instructions in the implementation of the present specification enable the portable electronic device to perform the steps of the identity verification method shown in FIG. 3 related to the agent client, including: obtaining identity verification input information of a business platform and generating a corresponding identity verification request, the identity verification input information indicating an identity verification parameter for identity verification and an identity verification platform that executes the identity verification; and sending the identity verification request to the identity verification platform for the identity verification platform to perform identity verification on the identity verification parameter based on local security data and submit a transaction including a verifiable credential of a result of the identity verification to a blockchain, where the business platform is enabled to search a block of the blockchain for the transaction including the verifiable credential to determine a result of the identity verification corresponding to the identity verification request based on the verifiable credential, the security data being privacy data of the identity verification platform.

In some implementations, when executed by a portable electronic device including a plurality of application programs, the instructions in the implementation of the present specification enable the portable electronic device to perform the steps of the identity verification method shown in FIG. 3 related to the business platform, including: providing identity verification input information to an agent client, the identity verification input information indicating an identity verification parameter for identity verification and an identity verification platform that executes the identity verification for the agent client to generate a corresponding identity verification request based on the identity verification input information and send the identity verification request to the identity verification platform, and for the identity verification platform to perform identity verification on the identity verification parameter based on local security data and submit a transaction including a verifiable credential of a result of the identity verification to a blockchain, the security data being privacy data of the identity verification platform; and searching a block of the blockchain for the transaction including the verifiable credential to determine a result of the identity verification corresponding to the identity verification request based on the verifiable credential.

Still in some implementations, when executed by a portable electronic device including a plurality of application programs, the instructions in the implementation of the present specification enable the portable electronic device to perform the steps of the identity verification method shown in FIG. 3 related to the identity verification platform, including: obtaining an identity verification request sent by an agent client, the identity verification request being generated by the agent client based on identity verification input information of a business platform, the identity verification input information indicating an identity verification parameter for identity verification and an identity verification platform that executes the identity verification; performing identity verification on the identity verification parameter based on local security data to obtain a result of the identity verification, the security data being privacy data of the identity verification platform; and submitting a transaction including a verifiable credential of a result of the identity verification to a blockchain for the business platform to search a block of the blockchain for the transaction including the verifiable credential to determine a result of the identity verification corresponding to the identity verification request based on the verifiable credential.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 8:
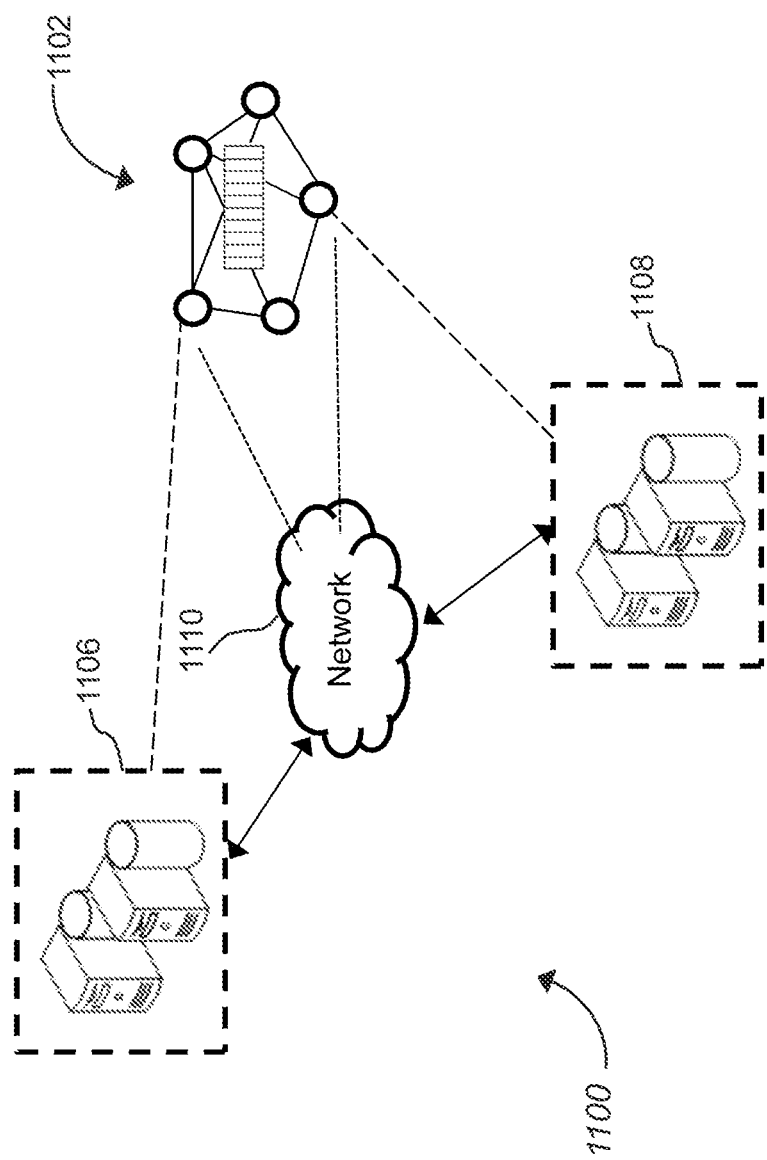
FIG. 8 is a diagram illustrating example environments that can be used to execute embodiments of this specification.

FIG. 8 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 8, the consortium blockchain network 1102 is represented as a peer-to-peer network of nodes, and the computing systems 1106, 1108 provide nodes of the first entity and second entity, respectively, which participate in the consortium blockchain network 1102.

Figure 9:
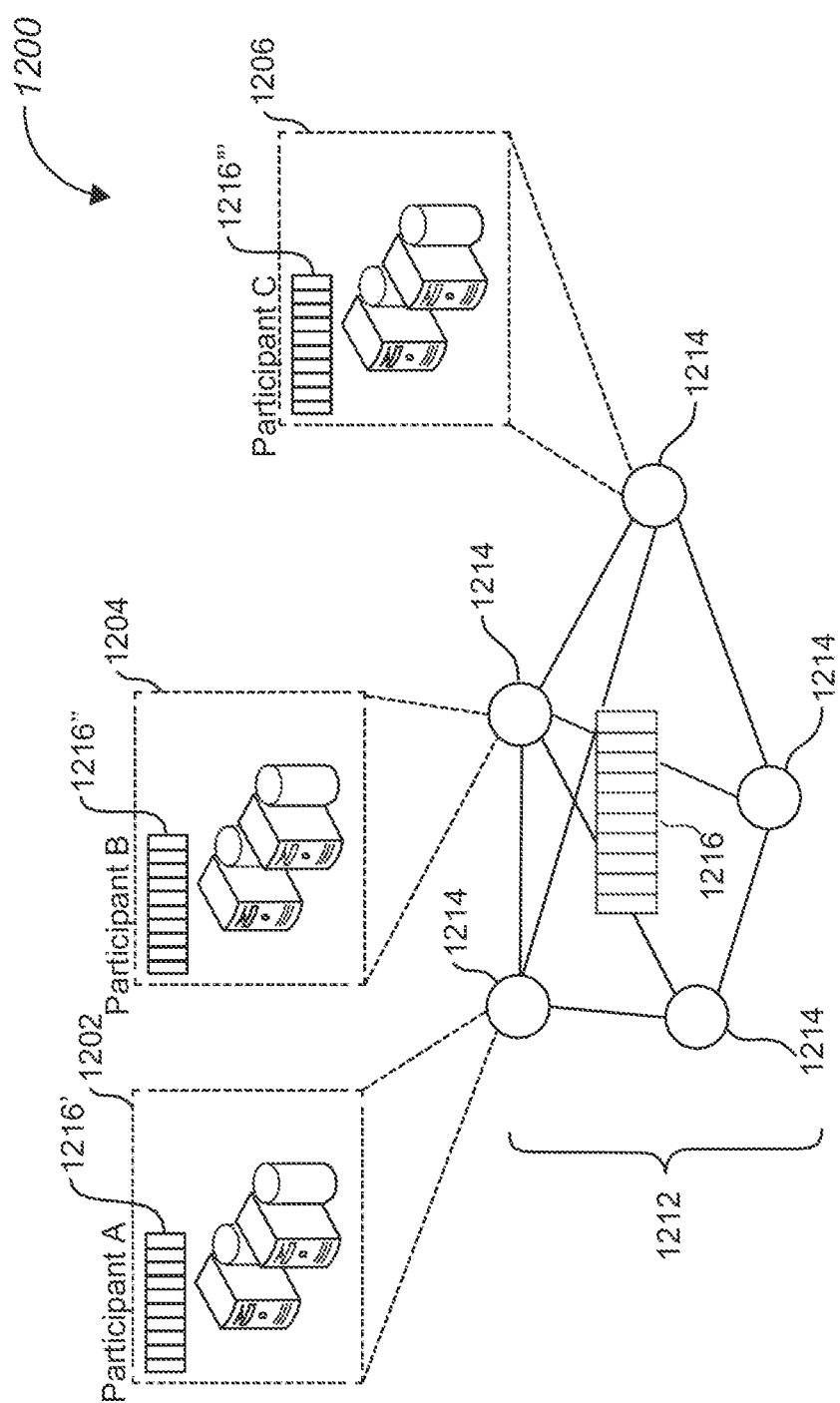
FIG. 9 is a diagram illustrating an example architecture in accordance with embodiments of this specification.

FIG. 9 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 9, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As an example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 9, the participant systems 1202, 1204 store respective, complete copies 1216', 1216", 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes." The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 9, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 9, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 9, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

A person skilled in the art should understand that the implementations of the present specification can be provided as methods, systems, or computer program products. Therefore, the present specification can use a form of hardware only implementations, software only implementations, or implementations with a combination of software and hardware. Moreover, the present specification can use a form of a computer program product that is implemented on one or more computer-usable storage media (including but not limited to a disk memory, a CD-ROM, an optical memory, etc.) that include computer-usable program code.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing are feasible or may be advantageous.

The previous descriptions are merely the implementations of the present specification, and are not intended to limit the present specification. For a person skilled in the art, the present specification can have various changes and variations. Any modifications, equivalent replacements, and improvements made within the spirit and principle of the present specification shall fall within the scope of the claims in the present specification. In addition, all other implementations obtained by a person of ordinary skill in the art without making innovative efforts shall fall within the protection scope of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A blockchain-based identity verification method, comprising:
    generating, by an agent client, an identity verification request based on identity verification input information of a business platform, the identity verification input information including an identity verification parameter for identity verification and indicating an identity verification platform that executes the identity verification;
    sending, by the agent client, the identity verification request to the identity verification platform;
    performing, by the identity verification platform, identity verification on the identity verification parameter to obtain a result of the identity verification;
    submitting, by the identity verification platform, a transaction including a verifiable credential of the result of the identity verification to a blockchain network; and
    searching, by the business platform, a blockchain of the blockchain network for the transaction including the verifiable credential to determine the result of the identity verification corresponding to the identity verification request based on the verifiable credential,
    wherein the identity verification request includes signature data encrypted based on a private key of the business platform and an identity verification parameter encrypted based on a public key of the identity verification on platform; and
    wherein the performing, by the identity verification platform, the identity verification on the identity verification parameter of the identity verification request includes:
        verifying, the identity verification platform, the signature data in the identity verification request based on a public key of the business platform after receiving the identity verification request;
        in response to the signature data being successfully verified, decrypting, by the identity verification platform, the identity verification parameter in the identity verification request based on a private key of the identity verification platform; and
        performing, by the identity verification platform, the identity verification on the encrypted identity verification parameter.

2. The method according to claim 1, wherein:
the identity verification request includes an identity verification business category of the identity verification request and identity verification auxiliary information; and
the method further comprises:
    before the performing, by the identity verification platform, the identity verification on the identity verification parameter of the identity verification request, determining, by the identity verification platform based on the identity verification auxiliary information in the identity verification request, whether the identity verification request meets an identity verification precondition corresponding to the identity verification business category,
    wherein the identity verification platform performs the identity verification on the identity verification parameter after determining that the identity verification request meets the identity verification precondition corresponding to the identity verification business category.

3. The method according to claim 2, wherein the identity verification business category is face-based identity verification, the identity verification input information includes facial image information of an identity verification object, and the identity verification auxiliary information includes certificate information of the identity verification object; and
wherein an identity verification precondition corresponding to the enterprise legal person face-based identity verification includes at least one of:
    an identity indicated by the certificate information of the identity verification object is consistent with the identity verification object; and
    a database used by the identity verification platform to perform identity verification on the facial image information of the identity verification object records a facial image sample of the identity verification object.

4. The method according to claim 2, further comprising:
generating, by the identity verification platform, a certificate ID of the identity verification request after determining that the identity verification request meets the identity verification precondition corresponding to the identity verification business category; and
the submitting, by the identity verification platform, the transaction including the verifiable credential of the result of the identity verification to the blockchain network includes:
    submitting, by the identity verification platform, the transaction including the verifiable credential of the result of the identity verification and the certificate ID to the blockchain network for the business platform to identify the transaction including the verifiable credential from the blockchain based on the certificate ID.

5. The method according to claim 4, further comprising:
retrieving, by the business platform, the verifiable credential from the blockchain to determine the result of the identity verification corresponding to the identity verification request based on the verifiable credential, including:
retrieving, by the business platform, the verifiable credential from the blockchain to verify a decentralization identifier (DID) signature of the identity verification platform included in the verifiable credential; and
in response to the verifying the DID signature of the identity verification platform being successful, determining, by the business platform, the result of the identity verification indicated by the verifiable credential as a final identity verification result of the identity verification request.

6. The method according to claim 1, wherein
the identity verification platform is an overseas platform with respect to the business platform, and the identity verification input information further indicates a routing address of a gateway of the identity verification platform.

7. A blockchain-based identity verification method, comprising:
obtaining, by an identity verification platform, an identity verification request sent by an agent client, the identity verification request including an identity verification parameter for identity verification and indicating the identity verification platform for executing the identity verification, the identity verification request including an identity verification business category of the identity verification request and identity verification auxiliary information;
determining, by the identity verification platform based on the identity verification auxiliary information in the identity verification request, whether the identity verification request meets an identity verification precondition corresponding to the identity verification business category;
after determining that the identity verification request meets the identity verification precondition corresponding to the identity verification business category, performing, by the identity verification platform, the identity verification on the identity verification parameter to obtain a result of the identity verification;
generating, by the identity verification platform, a certificate ID of the identity verification request after determining that the identity verification request meets the identity verification recondition corresponding to the identity verification business category; and
submitting, by the identity verification platform, a transaction including a verifiable credential of the identity verification result and the certificate ID to a blockchain network, for the business platform to search a blockchain of the blockchain network for the transaction including the verifiable credential to determine the result of the identity verification corresponding to the identity verification request based on the verifiable credential and the certificate ID.

8. The method according to claim 7, wherein:
the identity verification request includes signature data encrypted based on a private key of the business platform and an identity verification parameter encrypted based on a public key of the identity verification platform; and
the performing, by the identity verification platform, the identity verification on the identity verification parameter of the identity verification request includes:
verifying, by the identity verification platform, the signature data in the identity verification request based on a public key of the business platform after receiving the identity verification request;
in response to the signature data being successfully verified, decrypting, by the identity verification platform, the identity verification parameter in the identity verification request based on a private key of the identity verification platform; and
performing, by the identity verification platform, the identity verification on the encrypted identity verification parameter.

9. The method according to claim 7, wherein the identity verification business category is face-based identity verification, the identity verification input information includes facial image information of an identity verification object, and the identity verification auxiliary information includes certificate information of the identity verification object; and
wherein an identity verification precondition corresponding to the enterprise legal person face-based identity verification includes at least one of:
an identity indicated by the certificate information of the identity verification object is consistent with the identity verification object; and
a database used by the identity verification platform to perform identity verification on the facial image information of the identity verification object records a facial image sample of the identity verification object.

10. The method according to claim 7, further comprising:
attaching, by the business platform, a decentralization identifier (DID) signature of the identity verification platform to the verifiable credential.

11. A computing system comprising a processor and a memory having computer executable instructions stored thereon, the computer executable instructions, when executed by the processor, configure the processor to implement acts including:
obtaining, by an identification verification platform, an identity verification request from an agent client, the identity verification request including an identity verification parameter for identity verification of a business platform and a routing parameter indicating to the agent client that the identity verification request is to be sent to the identification verification platform;
performing, by the identification verification platform, the identity verification on the identity verification parameter to obtain a result of the identity verification; and
submitting, by the identification verification platform, a transaction including a verifiable credential of the identity verification result to a blockchain network, for a party to search a blockchain of the blockchain network for the transaction including the verifiable credential to determine the result of the identity verification corresponding to the identity verification request based on the verifiable credential,
wherein the identity verification request includes signature data encrypted based on a private key of the business platform and the identity verification parameter is encrypted based on a public key of the identity verification platform; and
wherein the performing the identity verification on the identity verification parameter of the identity verification request includes:
verifying the signature data in the identity verification request based on a public key of the business platform after receiving the identity verification request;

in response to the signature data being successfully verified, decrypting the identity verification parameter in the identity verification request based on a private key of the identity verification platform; and performing, the identity verification on the encrypted identity verification parameter.

12. The computing system according to claim 11, wherein:
the identity verification request includes an identity verification business category of the identity verification request and identity verification auxiliary information; and
the acts include:
before the performing the identity verification on the identity verification parameter of the identity verification request,
determining, based on the identity verification auxiliary information in the identity verification request, whether the identity verification request meets an identity verification precondition corresponding to the identity verification business category,
wherein the identity verification is performed on the identity verification parameter after it is determined that the identity verification request meets the identity verification precondition corresponding to the identity verification business category.

13. The computing system according to claim 12, wherein the identity verification business category is face-based identity verification, the identity verification input information includes facial image information of an identity verification object, and the identity verification auxiliary information includes certificate information of the identity verification object; and
wherein an identity verification precondition corresponding to the enterprise legal person face-based identity verification includes at least one of:
an identity indicated by the certificate information of the identity verification object is consistent with the identity verification object; and
a database used to perform identity verification on the facial image information of the identity verification object records a facial image sample of the identity verification object.

14. The computing system according to claim 12, wherein the acts include:
generating a certificate ID of the identity verification request after determining that the identity verification request meets the identity verification precondition corresponding to the identity verification business category; and
the submitting the transaction including the verifiable credential of the result of the identity verification to the blockchain network includes:
submitting the transaction including the verifiable credential of the result of the identity verification and the certificate ID to the blockchain network for the party to identify the transaction including the verifiable credential from the blockchain based on the certificate ID.

15. The computing system according to claim 11, wherein the acts include:
attaching a decentralization identifier (DID) signature of the identity verification platform to the verifiable credential.

16. The computer system according to claim 11, wherein the identity verification request is received from an agent client, the agent client generating the identity verification request based on identity verification input information of the party, the identity verification input information indicating an identity verification platform for executing the identity verification.

17. A non-transitory storage medium having executable instructions stored thereon, the executable instructions, when executed by one or more processors, enabling the one or more processor to implement acts comprising:
generating, by an agent client, an identity verification request based on identity verification input information of a business platform, the identity verification input information including an identity verification parameter for identity verification and indicating an identity verification platform that executes the identity verification;
sending, by the agent client, the identity verification request to the identity verification platform;
determining, by the identity verification platform based on the identity verification auxiliary information in the identity verification request, whether the identity verification request meets an identity verification precondition corresponding to the identity verification business category;
after determining that the identity verification request meets the identity verification precondition corresponding to the identity verification business category, performing, by the identity verification platform, identity verification on the identity verification parameter to obtain a result of the identity verification;
generating, by the identity verification platform, a certificate ID of the identity verification request after determining that the identity verification request meets the identity verification precondition corresponding to the identity verification business category; submitting, by the identity verification platform, a transaction including a verifiable credential of the result of the identity verification and the certificate ID to a blockchain network for the business platform to identify the transaction including the verifiable credential from the blockchain based on the certificate ID; and
searching, by the business platform, a blockchain of the blockchain network for the transaction including the verifiable credential and the certificate UD to determine the result of the identity verification corresponding to the identity verification request based on the verifiable credential and the certificate ID.

18. The non-transitory storage medium according to claim 17, wherein:
the identity verification request includes signature data encrypted based on a private key of the business platform and an identity verification parameter encrypted based on a public key of the identity verification platform; and
the performing, by the identity verification platform, the identity verification on the identity verification parameter of the identity verification request includes:
verifying, by the identity verification platform, the signature data in the identity verification request based on a public key of the business platform after receiving the identity verification request;
in response to the signature data being successfully verified, decrypting, by the identity verification platform, the identity verification parameter in the identity verification request based on a private key of the identity verification platform; and performing, by the identity verification platform, the identity verification on the encrypted identity verification parameter.

19. The non-transitory storage medium according to claim 17, wherein the identity verification business category is face-based identity verification, the identity verification input information includes facial image information of an identity verification object, and the identity verification auxiliary information includes certificate information of the identity verification object; and wherein an identity verification precondition corresponding to the enterprise legal person face-based identity verification includes at least one of:

an identity indicated by the certificate information of the identity verification object is consistent with the identity verification object; and a database used by the identity verification platform to perform identity verification on the facial image information of the identity verification object records a facial image sample of the identity verification object.

20. The non-transitory storage medium according to claim 17, wherein the acts further comprise:

retrieving, by the business platform, the verifiable credential from the blockchain to verify a decentralization identifier (DID) signature of the identity verification platform included in the verifiable credential; and in response to the verifying the DID signature of the identity verification platform being successful, determining, by the business platform, the result of the identity verification indicated by the verifiable credential as a final identity verification result of the identity verification request.

* * * * *

UNITED STATES PATENT AND TRADEMARK OFFICE
CERTIFICATE OF CORRECTION

| | | |
|---|---|---|
| PATENT NO. | : 11,436,599 B2 | Page 1 of 1 |
| APPLICATION NO. | : 17/364005 | |
| DATED | : September 6, 2022 | |
| INVENTOR(S) | : Yawen Wei et al. | |

It is certified that error appears in the above-identified patent and that said Letters Patent is hereby corrected as shown below:

In the Claims

Column 25, Claim 1, Line 59:
"verification on platform; and"
Should read:
--verification platform; and--

Column 25, Claim 1, Line 64:
"verifying, the identity"
Should read:
--verifying, by the identity--

Column 27, Claim 7, Line 48:
"verification recondition corresponding"
Should read:
--verification precondition corresponding--

Column 29, Claim 11, Line 5:
"performing, the identity"
Should read:
--performing the identity--

Signed and Sealed this
Twenty-fourth Day of September, 2024

Katherine Kelly Vidal
*Director of the United States Patent and Trademark Office*